United States Patent [19]

Levy et al.

[11] Patent Number: 5,320,891

[45] Date of Patent: Jun. 14, 1994

[54] PARTICLE BARRIER NONWOVEN MATERIAL

[75] Inventors: Ruth L. Levy, Sugar Hill; Michael T. Morman, Alpharetta, both of Ga.

[73] Assignee: Kimberly-Clark Corporation, Neenah, Wis.

[21] Appl. No.: 999,244

[22] Filed: Dec. 31, 1992

[51] Int. Cl.$^5$ .................... B32B 5/12; B32B 5/18; B32B 5/26

[52] U.S. Cl. .................... 428/108; 55/528; 55/DIG. 5; 264/210.1; 264/288.4; 264/288.8; 428/109; 428/110; 428/113; 428/219; 428/236; 428/237; 428/239; 428/283; 428/286; 428/287; 428/296; 428/297; 428/298

[58] Field of Search .................... 55/528, DIG. 5; 264/210.1, 288.4, 288.8; 428/108, 109, 110, 113, 219, 236, 237, 239, 283, 286, 287, 296, 297, 298

[56] References Cited

U.S. PATENT DOCUMENTS

| | | | |
|---|---|---|---|
| 1,741,530 | 12/1929 | Mayer | 428/230 |
| 2,971,322 | 2/1961 | Bouvet | 57/140 |
| 3,047,444 | 7/1962 | Harwood | 428/153 |
| 3,059,313 | 10/1962 | Harmon | 428/198 |
| 3,081,519 | 3/1963 | Blades et al. | 428/338 |
| 3,169,899 | 2/1965 | Steuber | 428/198 |
| 3,256,258 | 6/1966 | Herrman | 526/348.1 |
| 3,396,071 | 8/1968 | Couzens | 428/280 |
| 3,406,033 | 10/1968 | Reitz | 427/173 |
| 3,438,844 | 4/1969 | Kumin | 428/292 |
| 3,485,695 | 12/1969 | Ness | 156/229 |
| 3,575,784 | 4/1971 | Phillips et al. | 428/224 |
| 3,772,417 | 11/1973 | Vogt | 264/230 |
| 3,932,682 | 1/1976 | Loft et al. | 428/296 |
| 3,949,128 | 4/1976 | Ostermeier | 428/152 |
| 4,013,816 | 3/1977 | Sabee et al. | 428/288 |
| 4,041,203 | 8/1977 | Brock et al. | 428/157 |
| 4,193,899 | 3/1980 | Brenner et al. | 524/216 |
| 4,209,563 | 6/1980 | Sisson | 428/288 |
| 4,342,812 | 8/1982 | Selwood | 428/286 |
| 4,443,513 | 4/1984 | Meitner et al. | 422/195 |
| 4,467,595 | 8/1984 | Kramers | 57/225 |
| 4,486,485 | 12/1984 | Sookne | 428/198 |
| 4,489,543 | 12/1984 | Bromley et al. | 57/208 |
| 4,515,854 | 5/1985 | Kogame et al. | 428/288 |
| 4,551,378 | 11/1985 | Carey, Jr. | 428/198 |

(List continued on next page.)

FOREIGN PATENT DOCUMENTS

| | | |
|---|---|---|
| 0019295 | 11/1980 | European Pat. Off. . |
| 0030418 | 6/1981 | European Pat. Off. . |
| 0127483 | 12/1984 | European Pat. Off. . |
| 0180703 | 3/1986 | European Pat. Off. . |

(List continued on next page.)

OTHER PUBLICATIONS

Translation of PCT/JP91/00594.

Primary Examiner—James C. Cannon
Attorney, Agent, or Firm—Karl V. Sidor; James B. Robinson

[57] ABSTRACT

Disclosed is a method of producing a nonwoven material having improved resistance to penetration by particles. The method includes the steps of heating at least one nonwoven web containing meltblown thermoplastic polymer fibers to a temperature at which the peak total energy absorbed by the nonwoven web of meltblown fibers is at least about 250 percent greater than the amount absorbed by the nonwoven web of meltblown fibers at room temperature; applying a tensioning force to neck the heated nonwoven web so that at least a portion of individual meltblown fibers have sections where the fiber diameter is substantially less than the diameter of the immediately adjacent sections; and cooling the necked nonwoven web Also disclosed is a nonwoven material composed of at least one web of meltblown thermoplastic polymer fibers, the web containing at least a portion of individual meltblown fibers having sections where the fiber diameter is substantially less than the diameter of the immediately adjacent sections so that the web is adapted to have improved resistance to particle penetration. The nonwoven material may be a component of a multilayer material having desirable resistance to particle penetration.

33 Claims, 10 Drawing Sheets

U.S. PATENT DOCUMENTS

| | | | |
|---|---|---|---|
| 4,554,121 | 11/1985 | Kramers | 264/103 |
| 4,554,207 | 11/1985 | Lee | 428/288 |
| 4,578,307 | 3/1986 | Niki et al. | 428/288 |
| 4,606,964 | 8/1986 | Wideman | 428/152 |
| 4,612,148 | 9/1986 | Motooka et al. | 264/49 |
| 4,652,487 | 3/1987 | Morman | 428/138 |
| 4,657,802 | 4/1987 | Morman | 428/152 |
| 4,696,779 | 9/1987 | Wideman | 264/211.13 |
| 4,714,647 | 12/1987 | Shipp, Jr. et al. | 428/212 |
| 4,720,415 | 1/1988 | VanderWielen et al. | 428/152 |
| 4,781,966 | 11/1988 | Taylor | 428/152 |
| 4,965,122 | 10/1990 | Morman | 428/225 |

FOREIGN PATENT DOCUMENTS

| | | |
|---|---|---|
| 0184932 | 6/1986 | European Pat. Off. . |
| 0236091 | 9/1987 | European Pat. Off. . |
| 0237642 | 9/1987 | European Pat. Off. . |
| 0503590A1 | 9/1992 | European Pat. Off. . |
| 1460514 | 6/1978 | Fed. Rep. of Germany . |
| 2046593 | 5/1980 | Fed. Rep. of Germany . |
| 2613963 | 6/1985 | Fed. Rep. of Germany . |
| 2632875 | 8/1985 | Fed. Rep. of Germany . |
| 2757526 | 3/1986 | Fed. Rep. of Germany . |
| 3438859 | 6/1989 | Fed. Rep. of Germany . |
| 2205407 | 8/1982 | France . |
| 1217498 | 12/1970 | United Kingdom . |
| 1308904 | 3/1973 | United Kingdom . |
| 1399666 | 7/1975 | United Kingdom . |
| 1487488 | 9/1977 | United Kingdom . |
| 1532467 | 11/1978 | United Kingdom . |
| 1532467 | 11/1978 | United Kingdom . |
| 1538671 | 1/1979 | United Kingdom . |
| 1575972 | 10/1980 | United Kingdom . |
| 1576436 | 10/1980 | United Kingdom . |
| 2149720 | 11/1984 | United Kingdom . |
| 2175026 | 4/1986 | United Kingdom . |

…

PARTICLE BARRIER NONWOVEN MATERIAL

FIELD OF THE INVENTION

The present invention relates to particle barrier materials and a method of making those materials.

BACKGROUND

There are many types of nonwoven webs that have application as particle barrier materials.

Nonwoven webs of very small diameter fibers or microfibers have long been known to be permeable to air and water vapor while remaining relatively impermeable to particles and/or liquid droplets (e.g., aerosols) Useful webs of small diameter fibers can be made by extruding non-elastomeric thermoplastic polymers utilizing fiber forming processes such as, for example, meltblowing processes. Such nonwoven webs of meltblown fibers formed from non-elastomeric polymers are relatively inexpensive and have many applications in limited use or disposable products that are designed to serve a barriers to particulate materials.

Important applications of such materials include, for example, medical and industrial coveralls, filter materials and face masks. In recent years, concern over the filtration efficiency of surgical face masks has grown because of problems associated with acquired immunodeficiency syndrome, tuberculosis and other infectious diseases which may be passed by droplets created in a medical environment as well as the use of laser surgery with its associated aerosol plume created by vaporization of tissue. In many applications of such particle barrier materials, it is desirable to provide a combination of particle barrier properties and porosity Unfortunately, it has been difficult to provide these properties together because conventional methods which increase particle barrier properties generally tend to decrease the porosity of a material.

Thus, a need exists for an inexpensive material which is porous and breathable yet relatively impermeable to particles and/or liquid droplets

DEFINITIONS

As used herein, the terms "stretch" and "elongation" refer to the difference between the initial dimension of a material and that same dimension after the material is stretched or extended following the application of a biasing force. Percent stretch or elongation may be expressed as [(stretched length−initial sample length)/initial sample length] ×100. For example, if a material having an initial length of 1 inch is stretched 0.85 inch, that is, to a stretched or extended length of 1.85 inches, that material can be said to have a stretch of 85 percent.

As used herein, the term "nonwoven web" refers to a web that has a structure of individual fibers or filaments which are interlaid, but not in an identifiable repeating manner. Nonwoven webs have been, in the past, formed by a variety of processes known to those skilled in the art such as, for example, meltblowing, spunbonding and bonded carded web processes.

As used herein, the term "spunbonded web" refers to a web of small diameter fibers and/or filaments which are formed by extruding a molten thermoplastic material as filaments from a plurality of fine, usually circular, capillaries in a spinnerette with the diameter of the extruded filaments then being rapidly reduced, for example, by non-eductive or eductive fluid-drawing or other well known spunbonding mechanisms. The production of spunbonded nonwoven webs is illustrated in patents such as Appel, et al., U.S. Pat. No. 4,340,563; Dorschner et al., U.S. Pat. No. 3,692,618; Kinney, U.S. Pat. Nos. 3,338,992 and 3,341,394; Levy, U.S. Pat. No. 3,276,944; Peterson, U.S. Pat. No. 3,502,538; Hartman, U.S. Pat. No. 3,502,763; Dobo et al., U.S. Pat. No. 3,542,615; and Harmon, Canadian Patent No. 803,714.

As used herein, the term "meltblown fibers" means fibers formed by extruding a molten thermoplastic material through a plurality of fine, usually circular, die capillaries as molten threads or filaments into a high-velocity gas (e.g. air) stream which attenuates the filaments of molten thermoplastic material to reduce their diameters, which may be to microfiber diameter. Thereafter, the meltblown fibers are carried by the high-velocity gas stream and are deposited on a collecting surface to form a web of randomly disbursed meltblown fibers The meltblown process is well-known and is described in various patents and publications, including NRL Report 4364, "Manufacture of Super-Fine Organic Fibers" by V. A. Wendt, E. L. Boone, and C. D. Fluharty; NRL Report 5265, "An Improved device for the Formation of Super-Fine Thermoplastic Fibers" by K. D. Lawrence, R. T. Lukas, and J. A. Young; and U.S. Pat. No. 3,849,241, issued Nov. 19, 1974, to Buntin, et al.

As used herein, the term "microfibers" means small diameter fibers having an average diameter not greater than about 100 microns, for example, having a diameter of from about 0.5 microns to about 50 microns, more specifically microfibers may also have an average diameter of from about 1 micron to about 20 microns. Microfibers having an average diameter of about 3 microns or less are commonly referred to as ultra-fine microfibers. A description of an exemplary process of making ultra-fine microfibers may be found in, for example, U.S. patent application Ser. No. 07/779,929, entitled "A Nonwoven Web With Improved Barrier Properties", filed Nov. 26, 1991, now abandoned, incorporated herein by reference in its entirety As used herein, the term "thermoplastic material" refers to a high polymer that softens when exposed to heat and returns to about its original condition when cooled to room temperature. Natural substances which exhibit this behavior are crude rubber and a number of waxes. Other exemplary thermoplastic materials include, without limitation, polyvinyl chloride, polyesters, nylons, polyfluorocarbons, polyethylene, polyurethane, polystyrene, polypropylene, polyvinyl alcohol, caprolactams, and cellulosic and acrylic resins.

As used herein, the term "immediately adjacent" refers to an abutting, adjoining or contiguous configuration. For example, immediately adjacent fiber sections refers to portions along the length of a continuous fiber which are contiguous to a reference point Generally speaking, immediately adjacent fiber sections can be described as a length of fiber which may be within a linear distance of about 20 times the diameter of the fiber at the reference point and which is contiguous to the reference point. For example, the immediately adjacent fiber sections can be a length of fiber within a linear distance from about 2 to about 15 times the widest diameter of the fiber at the reference point and which is contiguous to the reference point.

As used herein, the term "disposable" is not limited to single use articles but also refers to articles that can be discarded if they become soiled or otherwise unusable after only a few uses.

As used herein, the term "particle penetration" refers to the passage of particles of a certain size range through a material. Generally speaking, the particle penetration may be calculated from the material's particle hold-out efficiency. When represented as a percent, the particle penetration can be expressed by the following equation:

percent particle penetration = 100 − percent particle holdout efficiency

A high particle holdout efficiency generally corresponds to a low particle penetration. Particle holdout efficiency may be measured by determining the air filter retention of dry particles utilizing tests such as, for example, IBR Test Method No. E-217, Revision G (Jan. 15, 1991) performed by InterBasic Resources, Inc. of Grass Lake, Michigan. Generally speaking, in such tests particulate matter is dispersed into the air on the "challenge" side of a test fabric by means of a fan which directs the particle-containing air onto the face of the test fabric. The concentration of dust particles in the "challenge" atmosphere and the concentration of dust particles in the atmosphere on the reverse side of the test fabric (i.e., the particles that have passed through the fabric) are measured in various size ranges by a particle counter. A particle holdout efficiency is calculated by determining the difference in the concentration and then dividing that value by the challenge side concentration.

As used herein, the term "particle barrier material" refers to a material having a useful level of resistance to penetration by particles and/or liquid droplets while retaining a desirable level of porosity Resistance to penetration by particles and/or liquid droplets may be measured by determining the air filter retention of dry particles and can be expressed as a particle holdout efficiency or percent particle penetration. Generally speaking, particle barrier materials should have a particle penetration of less than about 50 percent for particles having a specified diameter when measured utilizing a conventional particle holdout efficiency test. For example, a particle barrier material should have a particle penetration of less than about 50 percent for particles greater than about 1 micron. It is contemplated that some particle barrier materials may have a particle penetration measured to be greater than about 50 percent for certain sub-micron size particles under extremely rigorous particle holdout efficiency testing (e.g., extreme test conditions).

The term "α-transition" as used herein refers a phenomenon that occurs in generally crystalline thermoplastic polymers. The α-transition denotes the highest temperature transition below the melt transition ($T_m$) and is often referred to as pre-melting. Below the α-transition, crystals in a polymer are fixed. Above the α-transition, crystals can be annealed into modified structures. The α-transition is well known and has been described in such publications as, for example, Mechanical Properties of Polymers and Composites (Vol. 1) by Lawrence E. Nielsen; and Polymer Monographs, ed. H. Moraweitz, (Vol. 2—Polypropylene by H. P. Frank). Generally speaking, the α-transition is determined using Differential Scanning Calorimetry techniques on equipment such as, for example, a Mettler DSC 30 Differential Scanning Calorimeter Standard conditions for typical measurements are as follows: Heat profile, 30° C. to a temperature about 30° C. above the polymer melt point at a rate of 10° C./minute; Atmosphere, Nitrogen at 60 Standard Cubic Centimeters (SCC)/minute; Sample size, 3 to 5 milligrams.

The expression "onset of melting at a liquid fraction of five percent" refers to a temperature which corresponds to a specified magnitude of phase change in a generally crystalline polymer near its melt transition. The onset of melting occurs at a temperature which is lower than the melt transition and is characterized by different ratios of liquid fraction to solid fraction in the polymer. The onset of melting is determined using Differential Scanning Calorimetry techniques on equipment such as, for example, a Mettler DSC 30 Differential Scanning Calorimeter. Standard conditions for typical measurements are as follows: Heat profile, 30° to a temperature about 30° C. above the polymer melt point at a rate of 10° C./minute; Atmosphere, Nitrogen at 60 Standard Cubic Centimeters (SCC)/minute; Sample size, 3 to 5 milligrams.

As used herein, the term "necked material" refers to any material which has been constricted in at least one dimension by processes such as, for example, drawing.

As used herein, the term "neckable material" means any material which can be necked.

As used herein, the term "stretch direction" refers to the direction that the material is stretched.

As used herein, the term "percent neck-down" refers to the ratio determined by measuring the difference between the pre-necked dimension and the necked dimension of a neckable material and then dividing that difference by the pre-necked dimension of the neckable material; this quantity multiplied by 100. For example, the percent neck-down may be represented by the following expression:

percent neck-down = [(pre-necked dimension − necked dimension)/pre-necked dimension] × 100

As used herein, the term "consisting essentially of" does not exclude the presence of additional materials which do not significantly affect the desired characteristics of a given composition or product. Exemplary materials of this sort would include, without limitation, pigments, antioxidants, stabilizers, surfactants, waxes, flow promoters, particulates or materials added to enhance processability of a composition.

SUMMARY OF THE INVENTION

The present invention addresses the above described needs by providing a method of producing a nonwoven material having an improved resistance to particle penetration. The method of the present invention includes the steps of (1) heating a nonwoven material containing meltblown thermoplastic polymer fibers to a temperature at which the peak total energy absorbed by the web is at least about 250 percent greater than the amount absorbed by the web at room temperature; (2) applying a tensioning force to neck the heated nonwoven material so that at least a portion of individual meltblown fibers have sections where the fiber diameter is substantially less than the diameter of the immediately adjacent sections; and (3) cooling the necked nonwoven material.

Generally speaking, the nonwoven web of meltblown thermoplastic polymer fibers can be heated to a temperature at which the peak total energy absorbed by the web is at least about 275 percent greater than the amount absorbed by the web at room temperature. For example, the web can be heated to a temperature at which the peak total energy absorbed by the web is from about 300 percent greater to more than about 1000 percent greater than the amount absorbed by the web at room temperature. According to the present invention, the method produces a nonwoven material composed of at least one web of meltblown thermoplastic polymer fibers in which at least a portion of individual meltblown fibers have sections where the fiber diameter is substantially less than the diameter of the immediately adjacent sections so that particle penetration is decreased at least about 10 percent more than an identical nonwoven web in which the meltblown fibers do not exhibit such a change in fiber diameter For example, the nonwoven particle barrier material may be adapted to decrease particle penetration about 15 percent to 50 percent or more than an identical nonwoven web in which the meltblown fibers do not exhibit such a change in fiber diameter.

According to one aspect of the present invention, the nonwoven particle barrier material having an improved resistance to particle penetration has about the same porosity as an identical nonwoven material which has not been so treated to produce individual meltblown fibers having sections where the fiber diameter is substantially less than the diameter of the immediately adjacent sections. Generally speaking, the sections of individual meltblown fibers which exhibit a decrease in diameter should have a diameter at least about 10 percent less than the immediately adjacent fiber sections. For example, the drawn or narrowed sections may have a diameter from about 10 to about 90 percent less than the immediately adjacent fiber sections. As a further example, the drawn or narrowed sections may have a diameter from about 20 to about 50 percent less than the immediately adjacent fiber sections.

According to the present invention, the material may have a porosity exceeding about 20 $(ft^3/min)/ft^2$ (also, $CFM/ft^2$). For example, the particle barrier material may have a porosity ranging from about 25 to about 150 $CFM/ft^2$ As a further example, the particle barrier material may have a porosity ranging from about 30 to about 75 $CFM/ft^2$. The particle barrier material and/or laminates of such materials may have a basis weight of from about 6 to about 400 grams per square meter (gsm). For example, the basis weight may range from about 20 to about 150 grams per square meter.

The meltblown fibers of the material may include meltblown microfibers. Desirably, at least about 50 percent (based on the number of fibers), as determined by analytical image analysis, of the meltblown microfibers will have an average diameter of less than 5 microns. For example, at least about 50 percent of the meltblown fibers may be ultra-fine microfibers having an average diameter about 3 microns or less. As a further example, from about 60 percent to about 100 percent of the meltblown microfibers may have an average diameter of less than 5 microns or may be ultra-fine microfibers. The meltblown fibers are formed from a thermoplastic polymer which may be, for example, a polyolefin, polyester, or polyamide. If the polymer is a polyolefin, it may be polyethylene, polypropylene, polybutene, ethylene copolymers, propylene copolymers, butene copolymers and/or blends of the above.

The nonwoven web may also be a mixture of meltblown fibers and one or more secondary materials such as, for example, textile fibers, wood pulp fibers, particulates and superabsorbent materials. Where the meltblown fibers are formed from a polyolefin, the above-described heat treatment typically takes place at a temperature ranging from greater than the polymer's $\alpha$-transition to about 10 percent below the onset of melting at a liquid fraction of 5 percent In one aspect of the present invention, one or more layers of the particle barrier material may be joined with one or more other layers of material to form a multi-layer laminate. The other layers may be, for example, woven fabrics, knit fabrics, bonded carded webs, continuous filament webs (e.g., spunbonded webs), meltblown fiber webs, and combinations thereof.

In another aspect of the present invention, one or more layers of the particle barrier material may be cross-lapped with one or more other layers of the particle barrier material to form a multi-layer laminate.

DETAILED DESCRIPTION

Figure 1:
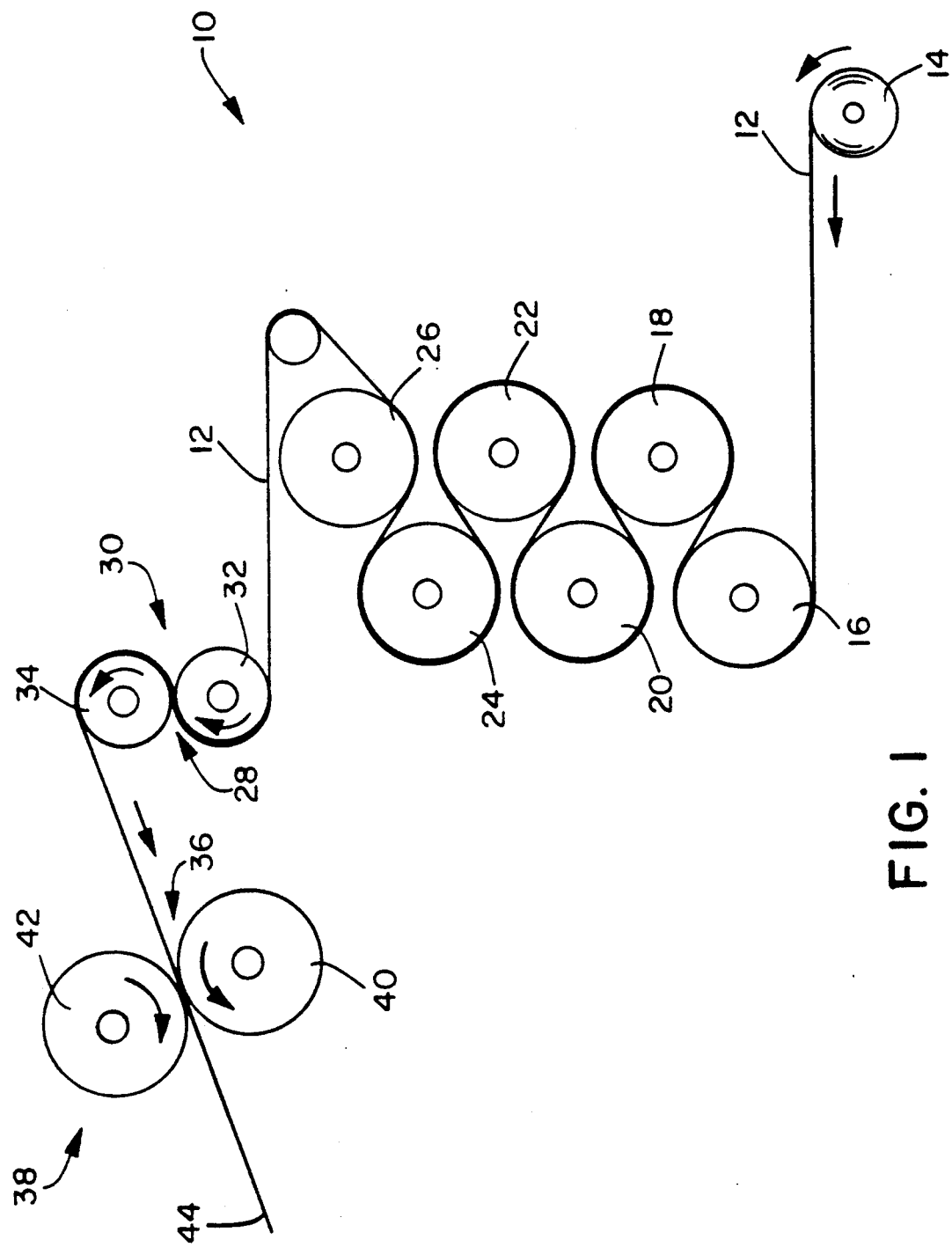
FIG. 1 is a schematic representation of an exemplary process for forming an exemplary improved particle barrier nonwoven material utilizing a series of steam cans.

Referring to FIG. 1 of the drawings there is schematically illustrated at 10 an exemplary process for making an improved particle barrier nonwoven material (i.e., a nonwoven material having improved resistance to particle penetration). FIG. 1 depicts a process in which a heat treatment is carried out utilizing a series of heated drums or steam cans.

According to the present invention, a nonwoven neckable material 12 is unwound from a supply roll 14 and travels in the direction indicated by the arrow associated therewith as the supply roll 14 rotates in the direction of the arrows associated therewith.

The nonwoven neckable material 12 may be formed by one or more meltblowing processes and passed directly through the nip 16 without first being stored on a supply roll 14.

The neckable material 12 passes over a series of heated drums (e.g., steam cans) 16–26 in a series of reverse S-loops. The steam cans 16-26 typically have an outside diameter of about 24 inches although other sized cans may be used. The contact time or residence time of the neckable material on the steam cans to effect heat treatment will vary depending on factors such as, for example, steam can temperature, type and/or basis weight of material, and diameter of the meltblown fibers in the material. The contact time should be sufficient to heat the nonwoven neckable material 12 to a temperature at which the peak total energy absorbed by the neckable material is at least about 250 percent greater than the amount absorbed by the neckable material 12 at room temperature. For example, the contact time should be sufficient to heat the nonwoven neckable material 12 to a temperature at which the peak total energy absorbed by the neckable material is at least about 275 percent greater than the amount absorbed by the neckable material at room temperature. As a further example, the neckable material can be heated to a temperature at which the peak total energy absorbed by the neckable material is from about 300 percent greater to more than about 1000 percent greater than the amount absorbed by the neckable material at room temperature.

The present invention may be practiced utilizing polymers such as, for example, polyolefins, polyesters and polyamides. Exemplary polyolefins include one or more of polyethylene, polypropylene, polybutene, ethylene copolymers, propylene copolymers and butene copolymers. Polypropylenes that have been found useful include, for example, polypropylene available from the Himont Corporation under the trade designation PF-015 and polypropylene available from the Exxon Chemical Company under the trade designation Exxon 3445G. Chemical characteristics of these materials are available from their respective manufacturers.

Generally speaking, when the nonwoven neckable material 12 is a nonwoven web of meltblown thermoplastic polymer fibers formed from a polyolefin such as, for example, polypropylene, the residence time on the steam cans should be sufficient to heat the meltblown fibers to a temperature ranging from greater than the polymer's α-transition to about 10 percent below the onset of melting at a liquid fraction of 5 percent.

For example, a nonwoven web of meltblown polypropylene fibers may be passed over a series of steam cans heated to a measured surface temperature from about 90° to about 150° C. (194°-302° F.) for a contact time of about 1 to about 300 seconds to provide the desired heating of the web. Alternatively and/or additionally, the nonwoven web may be heated by infra-red radiation, microwaves, ultrasonic energy, flame, hot gases, hot liquids and the like. For example, the nonwoven web may be passed through a hot oven.

Although the inventors should not be held to a particular theory, it is believed that heating a nonwoven web of meltblown thermoplastic non-elastomeric, generally crystalline polymer fibers to a temperature greater than the polymer's α-transition before applying tension is important. Above the α-transition, crystals in the polymer fibers can be annealed into modified structures which, upon cooling in fibers held in a tensioned configuration, enhance the particle penetration resistance (i.e., resistance to penetration by particles) of a nonwoven web composed of such fibers. It is also believed that the meltblown fibers should not be heated to a temperature greater than the constituent polymer's onset of melting at a liquid fraction of five percent. Desirably, this temperature should be more than 10 percent below the temperature determined for the polymer's onset of melting at a liquid fraction of 5 percent. One way to roughly estimate a temperature approaching the upper limit of heating is to multiply the polymer melt temperature (expressed in degrees Kelvin) by 0.95.

Importantly, it is believed that heating the meltblown fibers within the specified temperature range permits the fibers to become drawn during necking rather than merely slipping over one another in response to the tensioning force. This drawing force is distributed through meltblown fibers so that at least a portion of individual meltblown fibers have sections where the fiber diameter is substantially less than the diameter of the immediately adjacent sections. The narrowed sections of the individual meltblown fibers are believed to be associated with improved resistance to particle penetration. This change in fiber diameter may be observed in scanning electron microphotographs of the nonwoven particle barrier material Generally speaking, the sections of individual meltblown fibers which exhibit a decrease in diameter should have a diameter at least about 10 percent less than the immediately adjacent fiber portions. For example, the drawn or narrowed portions may have a diameter from about 10 to about 95 percent less than the immediately adjacent fiber portions. As a further example, the drawn or narrowed portions may have a diameter from about 10 to about 50 percent less than the immediately adjacent fiber portions.

Additionally, the drawing force changes the general orientation of the meltblown fibers in the nonwoven web from a random configuration to a somewhat oriented or linear configuration. It is believed that this orientation of fibers causes a change in the geometry of the pores in the nonwoven web. It is thought that the control material contains pores which tend to be circular in shape. After the heat treatment and stretching, these pores are thought to take on a rather oblong or elongated configuration which contains about the same cross-sectional area. Since the narrowest dimension of the pores is believed to be decreased without changing the overall area of the pore, the narrowed pore becomes a greater obstacle to the passage of a particle and/or liquid droplet without diminishing the area available for the passage of gas or other fluid (e.g., liquid) which entrains the particle The drawn portions of individual meltblown fibers and the modified pore geometry of the treated nonwoven material, along or in combination, are believed to adapt the treated nonwoven material so that particle penetration is decreased at least about .10 percent more than an identical nonwoven web which has not been treated to produce the above-described change in fiber diameter and/or fiber orientation.

The nonwoven web of meltblown fibers may be formed utilizing conventional meltblowing processes. Desirably, the meltblown fibers of the nonwoven web will include meltblown microfibers to provide enhanced particle barrier properties. For example, at least about 50 percent, as determined by analytical image analysis, of the meltblown microfibers may have an average diameter of less than about 5 microns. As yet another example, at least about 50 percent of the meltblown fibers may be ultra-fine microfibers that may have an average diameter of less than about 3 microns. As a further example, from about 60 percent to about 100 percent of the meltblown microfibers may have an average diameter of less than 5 microns or may be ultra-fine microfibers.

The nonwoven web may also be a mixture of meltblown fibers and one or more secondary materials. As an example of such a nonwoven web, reference is made to U.S. Pat. Nos. 4,100,324 and 4,803,117, the contents of each of which are incorporated herein by reference in their entirety, in which meltblown fibers and other materials are commingled to form a single coherent web of randomly dispersed fibers. Such mixtures may be formed by adding fibers and/or particulates to the gas stream in which meltblown fibers are carried so that an intimate entangled commingling of the meltblown fibers and other materials occurs prior to collection of the meltblown fibers upon a collection device to form a coherent web of randomly dispersed meltblown fibers and other materials. Useful materials which may be used in such nonwoven composite webs include, for example, wood pulp fibers, staple length fibers from natural and synthetic sources (e.g., cotton, wool, asbestos, rayon, polyester, polyamide, glass, polyolefin, cellulose derivatives and the like), multi-component fibers, absorbent fibers, electrically conductive fibers, and particulates such as, for example, activated charcoal/carbon, clays, starches, metal oxides, superabsorbent materials and mixtures of such materials. Other types of nonwoven composite webs may be used. For example, a hydraulically entangled nonwoven composite web may be used such as disclosed in U.S. Pat. Nos. 4,931,355 and 4,950,531 both to Radwanski, et al., the contents of which are incorporated herein by reference in their entirety.

From the steam cans, the heated neckable material 12 passes through the nip 28 of an S-roll arrangement 30 in a reverse-S path as indicated by the rotation direction arrows associated with the stack rollers 32 and 34. From the S-roll arrangement 30, the heated neckable material 12 passes through the nip 36 of a drive roller arrangement 38 formed by the drive rollers 40 and 42. Because the peripheral linear speed of the rollers of the S-roll arrangement 30 is controlled to be less than the peripheral linear speed of the rollers of the drive roller arrangement 38, the heated neckable material 12 is tensioned between the S-roll arrangement 30 and the nip of the drive roll arrangement 38. By adjusting the difference in the speeds of the rollers, the heated neckable material 12 is tensioned so that it necks a desired amount and is maintained in such tensioned, necked condition while it is cooled. Other factors affecting the neckdown of the heated neckable material are the distance between the rollers applying the tension, the number of drawing stages, and the total length of heated material that is maintained under tension. Cooling may be enhanced by the use of a cooling fluid such as, for example, chilled air or a water spray.

Generally speaking, the difference in the speeds of the rollers is sufficient to cause the heated neckable material 12 to neck-down to a width that is at least about 10 percent less than its original width (i.e., before application of the tensioning force). For example, the heated neckable material 12 may be necked-down to a width that is from about 15 percent to about 50 percent less than its original width.

The present invention contemplates using other methods of tensioning the heated neckable material 12. For example, tenter frames or other cross-machine direction stretcher arrangements that expand the neckable material 12 in other directions such as, for example, the cross-machine direction so that, upon cooling, the resulting material 44 will have improved resistance to particle penetration.

Importantly, the process of the present invention necks down the nonwoven material so that portions of the meltblown fibers are drawn such that at least a portion of individual meltblown fibers have sections where the fiber diameter is substantially less than the diameter of the immediately adjacent sections without compromising the porosity of the material. Meltblown fiber webs tend to resist necking and drawing because of their highly entangled fine fiber network. It is this same highly entangled network that is permeable to air and water vapor and yet is relatively impermeable to particles. Gross changes in this fiber network such as rips or tears would permit penetration by particles.

It has been found that heating the meltblown fiber web as described above, necking the heated material to produce fiber orientation and/or drawn or narrowed portions in individual meltblown fibers and then cooling the necked material, can decrease the particle penetration at least about 10 percent more than an identical nonwoven web in which the meltblown fibers do not exhibit such fiber orientation and/or change in fiber diameter without sacrificing the desirable porosity of the meltblown fiber web. Generally speaking, the process of the present invention does not create rips or tears which would significantly reduce the resistance to particle penetration of the particle barrier material Attempts to produce particle barrier materials which have meltblown fibers exhibiting the above-described changes in diameter in the absence of heat have generally been unsuccessful.

Alternatively and/or additionally, the particle barrier materials of the present invention having a basis weight of, for example, about 51 grams per square meter can provide resistance to penetration by particles expressed as a particle penetration of less than about 4 percent for particles having an average diameter ranging from about 1.5 microns to greater than about 10 microns. For example, such particle barrier materials may have a particle penetration of less than about 2 percent for particles having an average diameter ranging from about 1.5 microns to about 7 microns. Such particle barrier materials may also have a particle penetration of less than about 50 percent for particles having an average diameter greater than about 0.09 micron. For example, such a particle barrier material may have a particle penetration of less than about 40 percent for particles having an average diameter ranging from about 0.09 to about 1 micron. As a further example, the particle barrier material may have a particle penetration of less than about 50 percent for particles having an average diameter greater than about 0.1 micron. For example, a particle barrier material having a basis weight of about 51 gsm may have a particle penetration of less than about 40 percent or more for particles having an average diameter ranging from about 0.3 to about 1 micron.

Furthermore, the particle barrier material of the present invention may have a porosity exceeding about 20 ft$^3$/min/ft$^2$ (CFM/ft$^2$). For example, the particle barrier material may have a porosity ranging from about 25 to about 100 CFM/ft$^2$. As another example, the particle barrier material may have a porosity ranging from about 30 to about 75 CFM/ft$^2$.

Desirably, the particle barrier material has a basis weight of from about 6 to about 400 grams per square meter. For example, the basis weight may range from about 10 to about 150 grams per square meter. As another example, the basis weight may range from about 15 to about 90 grams per square meter. Particle barrier properties generally improve with increasing basis weight. In the past, heavier basis weights were needed to provide satisfactory levels of toughness and resistance to particle penetration. The particle barrier material of the present invention provides satisfactory resistance to particle penetration at relatively low basis weights (e.g., about 10 gsm to about 30 gsm). This is due in part to heating the material before applying the tensioning forces to reduce the likelihood of tears and rips common to lightweight particle barrier materials and which destroy particle barrier properties. In addition, it is believed that the drawn portions of individual meltblown fibers as well as the modified pore geometry of the treated nonwoven material, along or in combination, provide improved resistance to particle penetration. Although the necking process does tend to increase the basis weight of the nonwoven material, the increase is generally quite small, especially when compared to the decrease in particle penetration provided by the necked material. For example, some materials may show an increase in basis weight of about 15 percent or less while providing a decrease in particle penetration which is much greater than 15 percent (e.g. 25 percent, 50 percent or more).

Thus, the present invention provides an economical and practical particle barrier material for yet another reason in that it allows lightweight nonwoven particle barrier materials to be used more efficiently and effectively.

The particle barrier material of the present invention may also be joined to one or more layers of another material to form a multi-layer laminate. The other layers may be, for example, woven fabrics, knit fabrics, bonded carded webs, continuous filaments webs, meltblown fiber webs, and combinations thereof. Desirably, the other materials will have about the same or even greater degree of porosity as the particle barrier material For example, if the particle barrier material has a porosity greater than about 20 CFM/ft$^2$, the other layers of material should also have a porosity of at least about 20 CFM/ft$^2$.

In an embodiment of the present invention, one or more layers of the particle barrier material may be overlaid with one or more other layers of the particle barrier material to form a multi-layer laminate. For example, the layers may be cross-lapped so that the general directions of fiber orientation (e.g. the machine directions) of each fabric are about perpendicular. In other embodiments, the layers may be overlaid so that the general directions of fiber orientation between each layer form an angle between 0 and 90 degrees.

It is believed that varying the directions of fiber orientation of each layer in the multi-layer laminate should enhance the laminate's resistance to particle penetration. As discussed above, the orientation of fibers in each layer produces a change in the geometry of the pores in the nonwoven web. After the heat treatment and stretching, these pores are thought to take on a rather oblong or elongated configuration which contains about the same cross-sectional area. Since the narrowest dimension of the pores is believed to be decreased without changing the overall area of the pore, the narrowed pore becomes a greater obstacle to the passage of a particle and/or liquid droplet without diminishing the area available for the passage of gas or other fluid which entrains the particle Generally speaking, it is thought that the oriented oblong pores in each layer of the laminate could be, in a very limited sense, analogized to a polarizing film. By varying the general directions of fiber orientation between each of the layers to form an angle between 0 and 90 degrees, it is thought that resistance to particle penetration of the laminate may be modified, at least to a small degree, so that different resistances could be produced at different angles of orientation.

Figure 3:
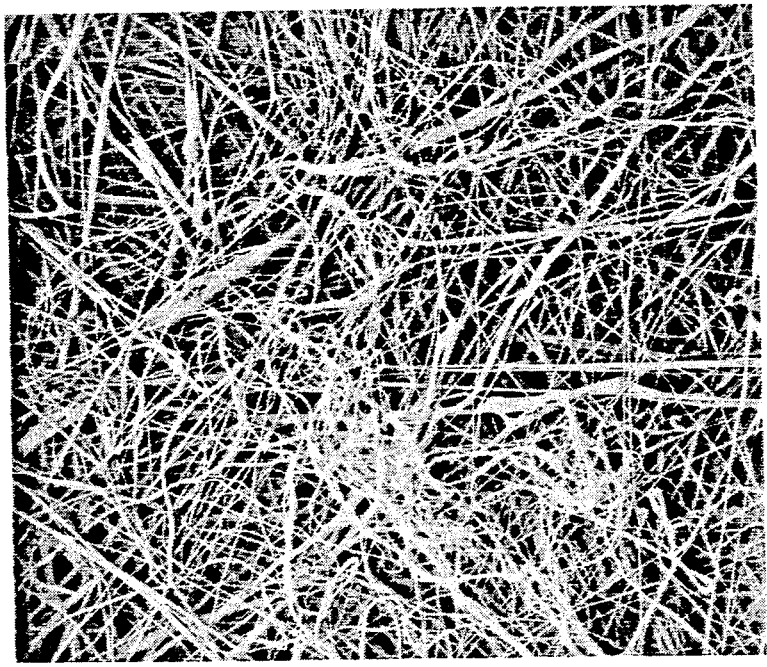
FIGS. 2 and 3 are photomicrographs of an exemplary neckable material, prior to treatment.
Figure 2:
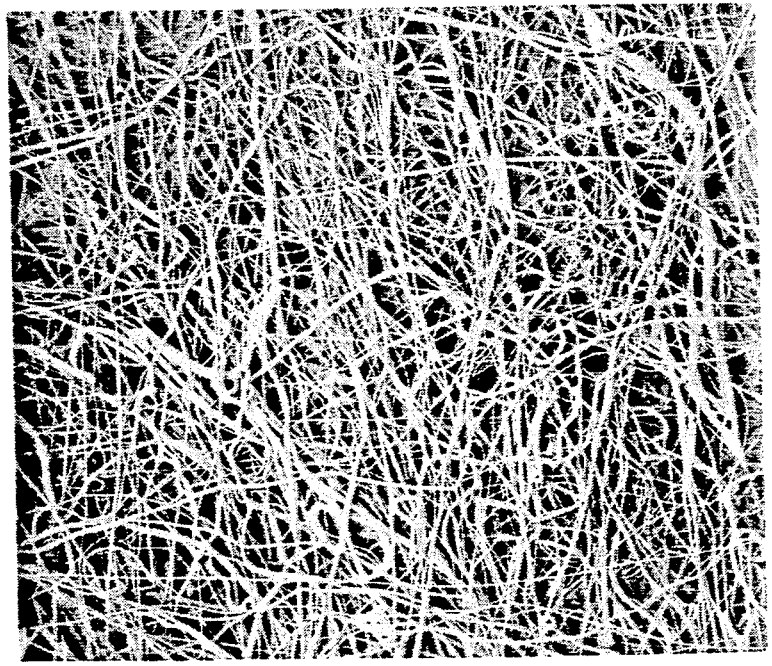

FIGS. 2-9 are scanning electron microphotographs of nonwoven webs of meltblown polypropylene fibers which have not been treated in accordance with the present invention. The materials shown in FIGS. 2 and 3 are 51 gsm nonwoven webs of meltblown polypropylene fibers formed utilizing conventional meltblowing process equipment.

Figure 5:
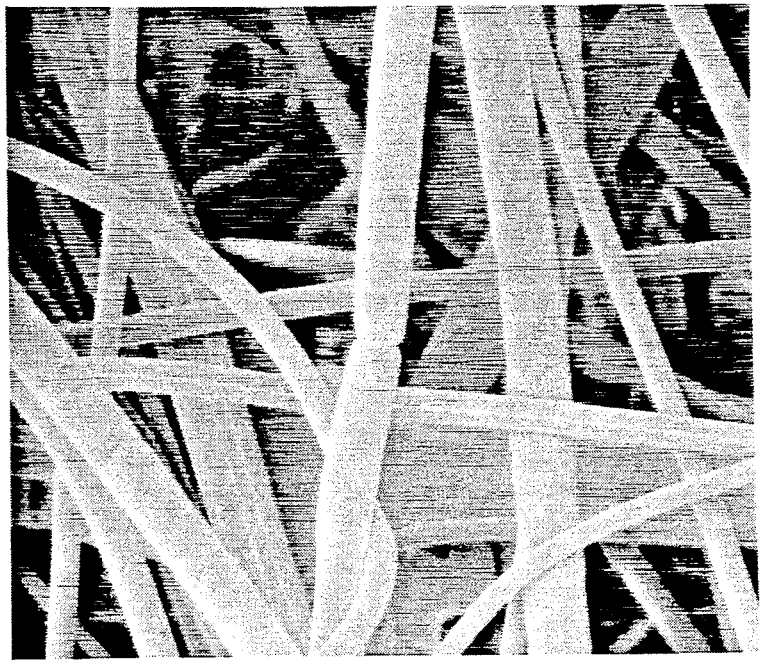
FIGS. 4 and 5 are enlarged photomicrographs of an exemplary neckable material, prior to treatment.
Figure 4:
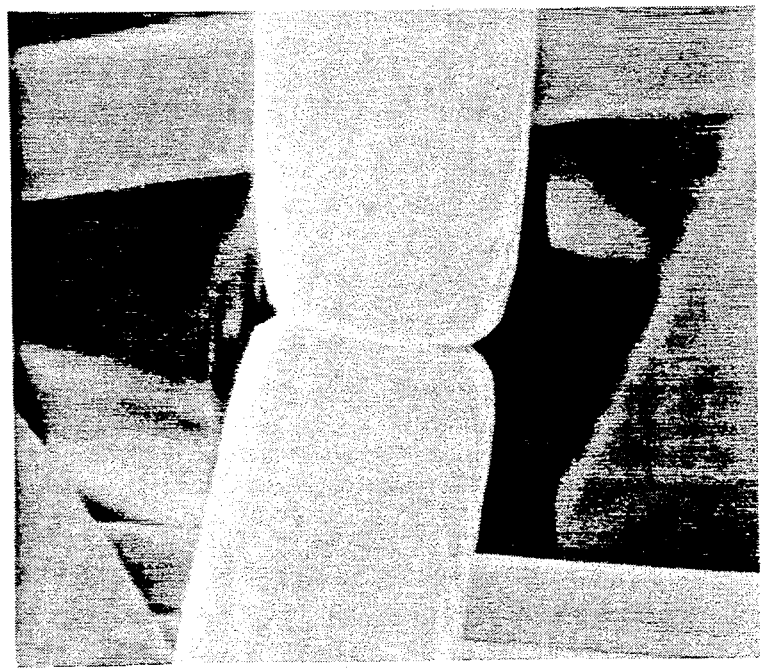

More particularly, FIGS. 2 and 3 are 50× (linear magnification) microphotographs of a nonwoven web of meltblown polypropylene fibers. FIG. 4 is a 5000× (linear magnification) microphotographs of a portion of the material shown in FIGS. 2 and 3. FIG. 5 is a 1000× (linear magnification) microphotographs of a portion of the material shown in FIGS. 2 and 3.

Figure 7:
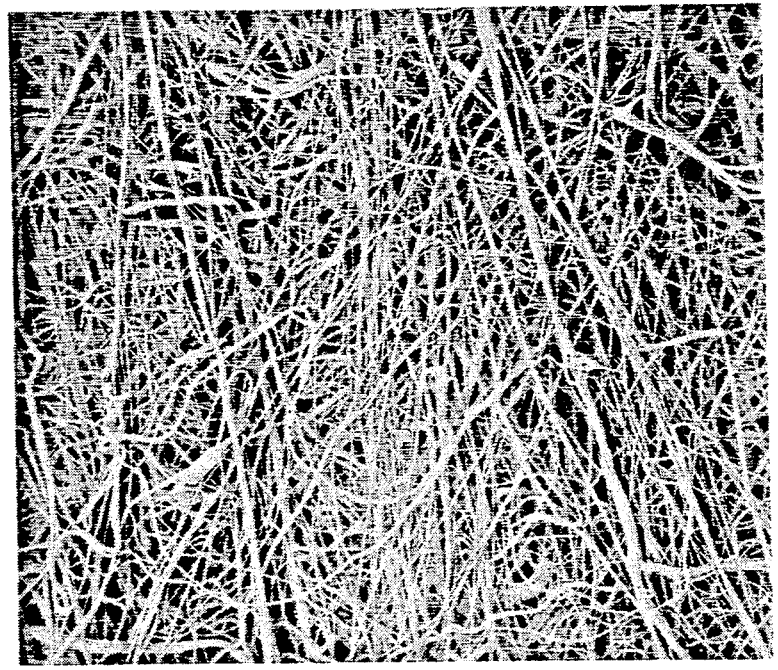
FIGS. 6 and 7 are photomicrographs of an exemplary neckable material which has been heated, necked and then cooled while maintained in the necked condition.
Figure 6:
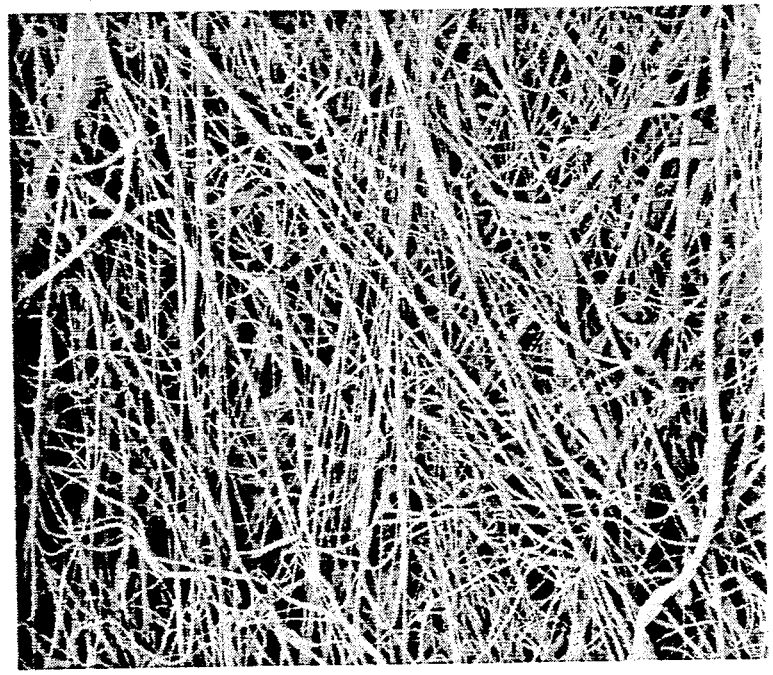

FIGS. 6 and 7 are scanning electron microphotographs of materials which have been heated to a specific temperature; stretched at that temperature and then cooled in the stretched condition. The fabric shown in FIGS. 6 and 7 was made from 51 gsm nonwoven web (unbonded) of meltblown polypropylene fibers formed utilizing conventional meltblowing process equipment. The nonwoven material was passed over a series of steam cans heated to a temperature of about 110° Centigrade for a total contact time of about 10 seconds A tensioning force was applied to neck the heated nonwoven material about 30 percent (i.e., a neckdown of about 30 percent) and the necked nonwoven material was cooled to room temperature while maintained in the necked condition.

More particularly, FIGS. 6 and 7 are 50× (linear magnification) microphotographs of the particle barrier material composed of meltblown polypropylene fibers and treated as described above. When compared to FIGS. 2 and 3, the meltblown fibers of the particle barrier material have a less random configuration and appear to be oriented across the width of the photograph.

FIGS. 8-17 are scanning electron microphotographs of materials which have been heated to various temperatures and then stretched at those temperatures until they broke. The scanning electron microphotographs were taken near the region of break. The specific conditions and procedures used to form the materials are given in Example 1. The material shown in FIGS. 8-17 was a 51 gsm nonwoven web (unbonded) of meltblown polypropylene fibers formed utilizing conventional meltblowing process equipment.

Figure 9:
FIGS. 8 and 9 are enlarged photomicrographs of a neckable material which has been heated to a temperature of about 30° C. and then stretched.
Figure 8:
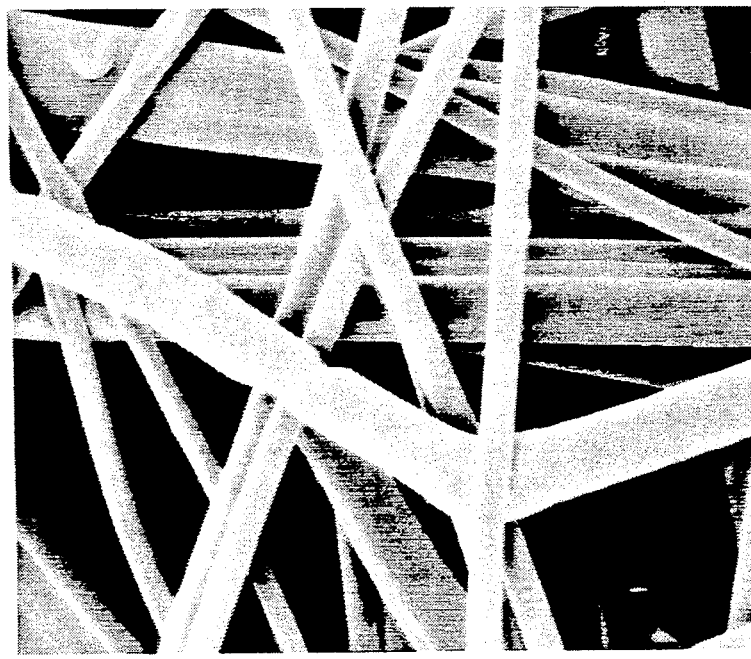

More particularly, FIGS. 8 and 9 are enlarged photomicrographs of a neckable material which has been heated to a temperature of about 30° C. and then stretched. FIG. 8 is a 1500× (linear magnification) microphotograph of a portion of the material FIG. 9 is a 1000× (linear magnification) microphotograph of a portion of the material.

Figure 11:
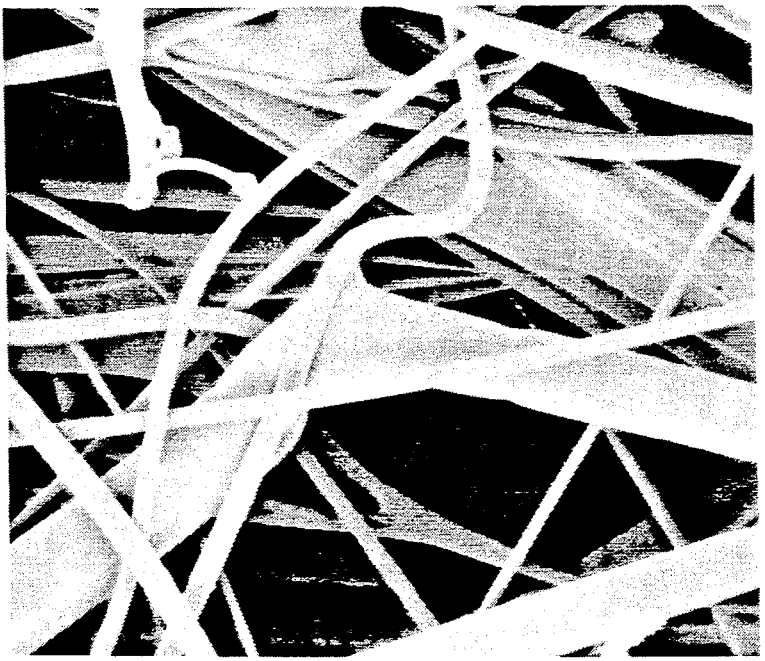
FIGS. 10 and 11 are enlarged photomicrographs enlarged photomicrographs of a neckable material which has been heated to a temperature of about 80° C. and then stretched.
Figure 10:

FIGS. 10 and 11 are enlarged photomicrographs of a neckable material which has been heated to a temperature of about 80° C. and then stretched. FIGS. 10 and 11 are 1000×0 (linear magnification) microphotographs of a portion of the material.

Figure 13:
FIGS. 12 and 13 are enlarged photomicrographs enlarged photomicrographs of a neckable material which has been heated to a temperature of about 105° C. and then stretched.
Figure 12:
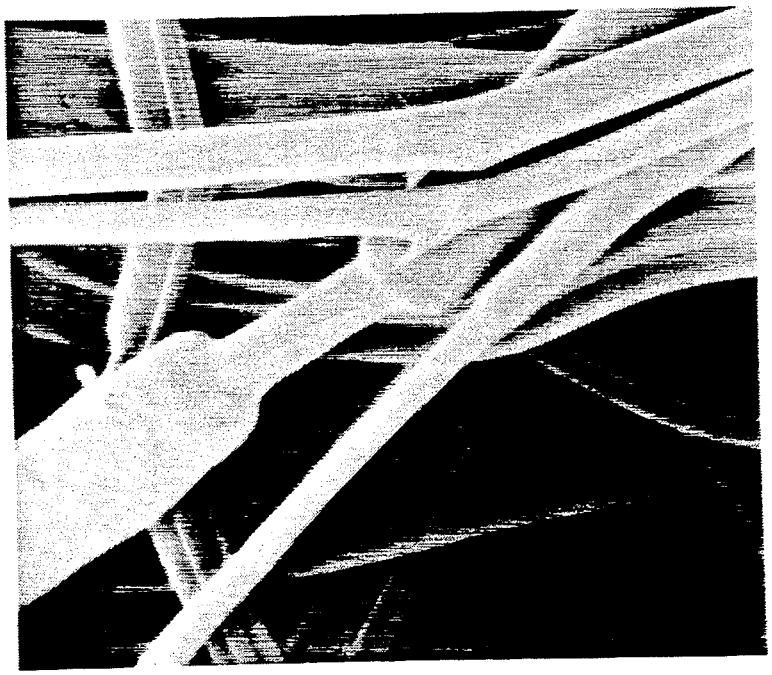
Figure 15:
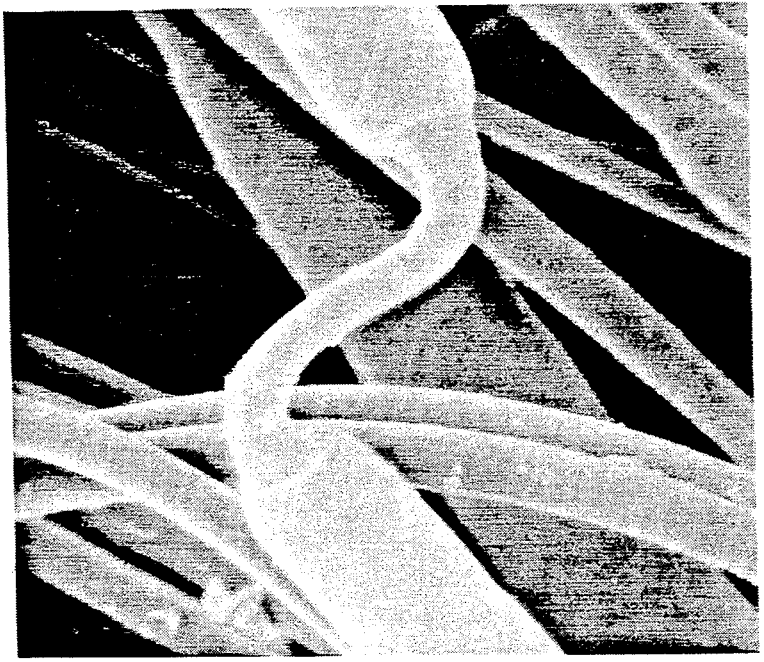
FIGS. 14 and 15 are enlarged photomicrographs of a neckable material which has been heated to a temperature of about 130° C. and then stretched.
Figure 14:
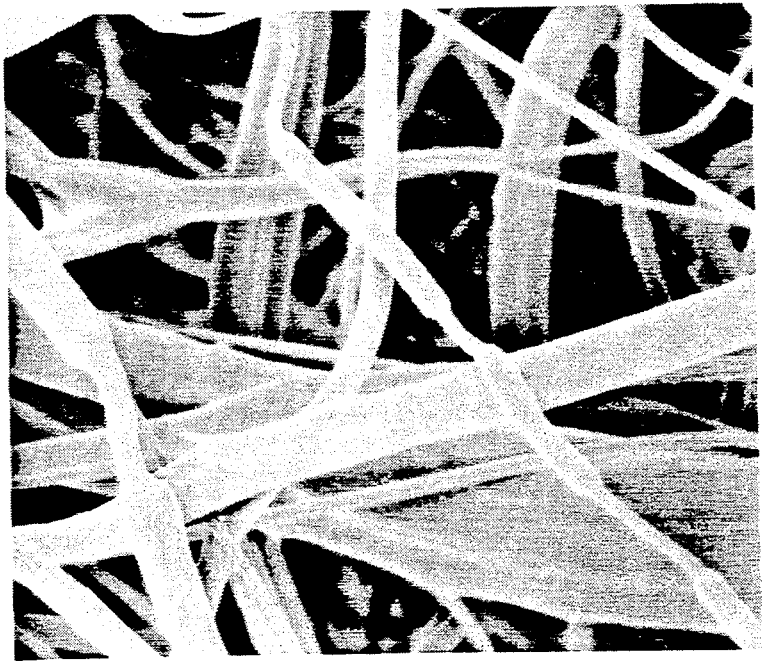

FIGS. 12 and 13 are enlarged photomicrographs of a neckable material which has been heated to a temperature of about 105° C. and then stretched. FIG. 12 is a 1500× (linear magnification) microphotograph of a portion of the material. FIG. 13 is a 1000× (linear magnification) microphotograph of a portion of the material FIGS. 14 and 15 are enlarged photomicrographs of a neckable material which has been heated to a temperature of about 130° C. and then stretched. FIG. 14 is a 700× (linear magnification) microphotograph of a portion of the material. FIG. 15 is a 3000× (linear magnification) microphotograph of a portion of the material.

Figure 17:
FIGS. 16 and 17 are enlarged photomicrographs enlarged photomicrographs of a neckable material which has been heated to a temperature of about 150° C. and then stretched.
Figure 16:
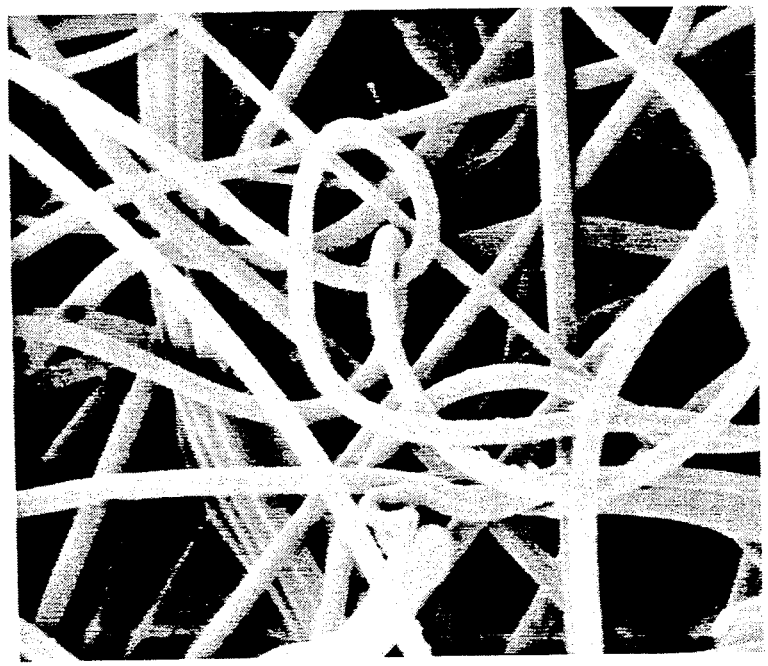

FIGS. 16 and 17 are enlarged photomicrographs of a neckable material which has been heated to a temperature of about 150° C. and then stretched. FIGS. 16 and 17 are 1000× (linear magnification) microphotographs of a portion of the material.

When the meltblown polypropylene fibers shown in FIGS. 8, 9, 16 and 17 are compared to the meltblown polypropylene fibers shown in FIGS. 10-15, the meltblown polypropylene fibers shown in FIGS. 10-15 have small sections where the fiber diameter is less that the diameter of the surrounding portions. It appears that the meltblown polypropylene fibers have actually been drawn or extended while the tensioning force was applied to the heated fibers. Although the inventors should not be held to a particular theory of operation, it is believed that the presence of the drawn sections on individual meltblown polypropylene fibers (as well as fiber orientation in the nonwoven web) is an indication that the meltblown polypropylene fibers have been heated to a temperature ranging from greater than the polypropylene's α-transition to about 10 percent below the onset of melting at a liquid fraction of 5 percent, stretched to produce the desired drawn sections in individual meltblown fibers (and/or fiber orientation) and then cooled so that the particle penetration decreased at least about 10 percent more than an identical nonwoven web in which the meltblown fibers do not exhibit the fiber orientation and/or change in fiber diameter.

EXAMPLE 1

A tensioning force was applied to neck a sample particle barrier material maintained under specific environmental conditions. Breaks and/or tears at low levels of necking would indicate loss of particle barrier properties. All samples were tested on the same equipment in the same environmental chamber.

The nonwoven particle barrier material tested was an unbonded nonwoven web of meltblown polypropylene fibers having a basis weight of about 51 gsm. A sample measuring about 3 inch by 6 inches (6 inch length running parallel to the machine direction (MD) of the sample) was loaded into the 3 inch by 1 inch (i.e., each jaw was 3 inches wide by 1 inch high) jaws of an Instron Model 1122 Universal lest Instrument. The jaws were surrounded by an Instron Model 3111 series 808 environmental chamber (which had a window in the door) during the tests so the sample environment (temperature) could be controlled. The environmental chamber was preset to a desired temperature and allowed to come to equilibrium. A thermometer was used to insure an accurate temperature reading.

After loading the jaws, the sample was held in the chamber for at least three minutes to permit the sample to heat up and let the chamber reattain equilibrium.

A video camera was moved into position so the sample could be seen through a window in the chamber. The distance from the camera lens to the sample was about 12 inches. A macro lens was used and focused to enlarge the sample. The camera was started and run for about 5 seconds to provide a sample width reading at zero tension before the Instron crosshead was started. The following Instron measurements were made for each sample: (1) peak load, peak elongation, and peak total energy absorbed; and (2) break load, break elongation and total energy absorbed at break. The tensile testing was conducted utilizing the Instron test equipment essentially in accordance with Method 5100 of Federal Test Method Standard No. 191A. The sample gauge length was set at 3 inches and the cross-head speed was set at 12 inches per minute.

The video camera tape was replayed on a freeze frame tape player. The freeze frame feature was used so the sample width could be measured directly off the viewing screen. One measurement was made viewing the tape of the unstretched sample (i.e., before starting the Instron test equipment). The tape was advanced to the point at which the sample broke and then backed-up a couple of frames to the point just before the sample broke A minimum sample width was measured directly off the viewing screen.

With respect to tensile properties, load refers to the force or resistance encountered while elongating a sample. Peak load refers to the maximum load encountered when elongating the sample. Break load refers the load encountered at the break or failure of a sample. As used herein, load is expressed in units of force (e.g., pounds-$_{force}$) for samples measuring 3 inches wide by 6 inches long.

Total energy absorbed refers to the total area under a stress versus strain (i.e., load vs. elongation) curve up to a specified load. Peak total energy absorbed is the total area under such a curve up to the point of peak or maximum load. Total energy absorbed at break is the total area under such a curve up to the load at break or failure of the sample. Total energy absorbed is expressed in units of work/(length)$^2$ such as, for example, (inch• lbs$_{force}$)/(inch)$^2$.

Elongation or stretch refers to a ratio determined by measuring the difference between a nonwoven web's initial unextended measurement (e.g., length) and its extended measurement in a particular dimension and dividing that difference by the nonwoven web's initial unextended measurement in that same dimension. This value is multiplied by 100 percent when elongation is expressed as a percent Peak elongation is the elongation measured when the material has been stretched to its peak load. Break elongation is the elongation measured when the material has be stretched to break or failure Table 1 provides a summary of the tensile properties for the unbonded material (i.e., a nonwoven web of meltblown polypropylene fibers—basis weight 51 gsm) measured during tests conducted at temperatures of 30° C., 55° C., 82° C., 95° C., 105° C., 130° C. and 150° C.

TABLE 1

| Tensile Property | | Temperature | | | | | | |
|---|---|---|---|---|---|---|---|---|
| | | 30° C. | 55° C. | 82° C. | 95° C. | 105° C. | 130° C. | 150° C. |
| Neck-down (%) @ Break | | 10.7 | 21.3 | 29.4 | 36.1 | 39.1 | 48.5 | 45.4 |
| Elongation (%) @ Peak Load | AVG. | 9.3 | 22.2 | 35.0 | 66.5 | 95.3 | 152 | 112.5 |
| | STD. | 0.8 | 7.5 | 7.3 | 5.4 | 19 | 6 | 12.4 |
| Elongation (%) @ Break | AVG. | 14.5 | 26.3 | 41.3 | 77.3 | 105.4 | 164 | 132 |
| | STD. | 2.1 | 8 | 7.3 | 7.7 | 19 | 14 | 25 |
| Peak Load (grams) | AVG. | 4845 | 4460 | 3995 | 3877 | 3726 | 2577 | 1703 |
| | STD. | 68 | 283 | 172 | 103 | 183 | 68 | 107 |
| Load at Break (grams) | AVG. | 1757 | 1722 | 1617 | 1478 | 1443 | 957 | 649 |
| | STD. | 96 | 231 | 173 | 147 | 65 | 34 | 112 |
| Break Total Energy Absorbed | AVG. | 1248 | 2501 | 3799 | 7480 | 9676 | 10080 | 5393 |
| | STD. | 148 | 760 | 883 | 846 | 1952 | 1341 | 1090 |
| Peak Total Energy Absorbed | AVG. | 733 | 2042 | 3124 | 6289 | 8630 | 9188 | 4442 |
| | STD. | 107 | 716 | 838 | 598 | 2033 | 336 | 283 |

It was found that heating the samples before applying the tensioning force had a significant effect on almost all of the measured variables Generally speaking, it was found that improved resistance to particle penetration could be imparted to the particle barrier materials (i.e., nonwoven webs of meltblown polypropylene fibers) without diminishing their porosity by heating the nonwoven webs of polypropylene fibers to a temperature at which the peak total energy absorbed by the nonwoven web of meltblown polypropylene fibers is at least about 250 percent greater than the amount absorbed by the nonwoven web of meltblown polypropylene fibers at room temperature; applying a tensioning force to neck the heated nonwoven web to produce fiber orientation and drawn portions in individual meltblown fibers; and cooling the necked nonwoven web. It was found to be desirable to heat the nonwoven web of meltblown polypropylene fibers to a temperature at which the peak total energy absorbed by the nonwoven web is at least about 275 percent greater than the amount absorbed by the nonwoven web at room temperature For example, the nonwoven web of meltblown polypropylene fibers can be heated to a temperature at which the peak total energy absorbed by the nonwoven web is from about 300 percent greater to more than about 1000 percent greater than the amount absorbed by the nonwoven web at room temperature.

Figure 18:
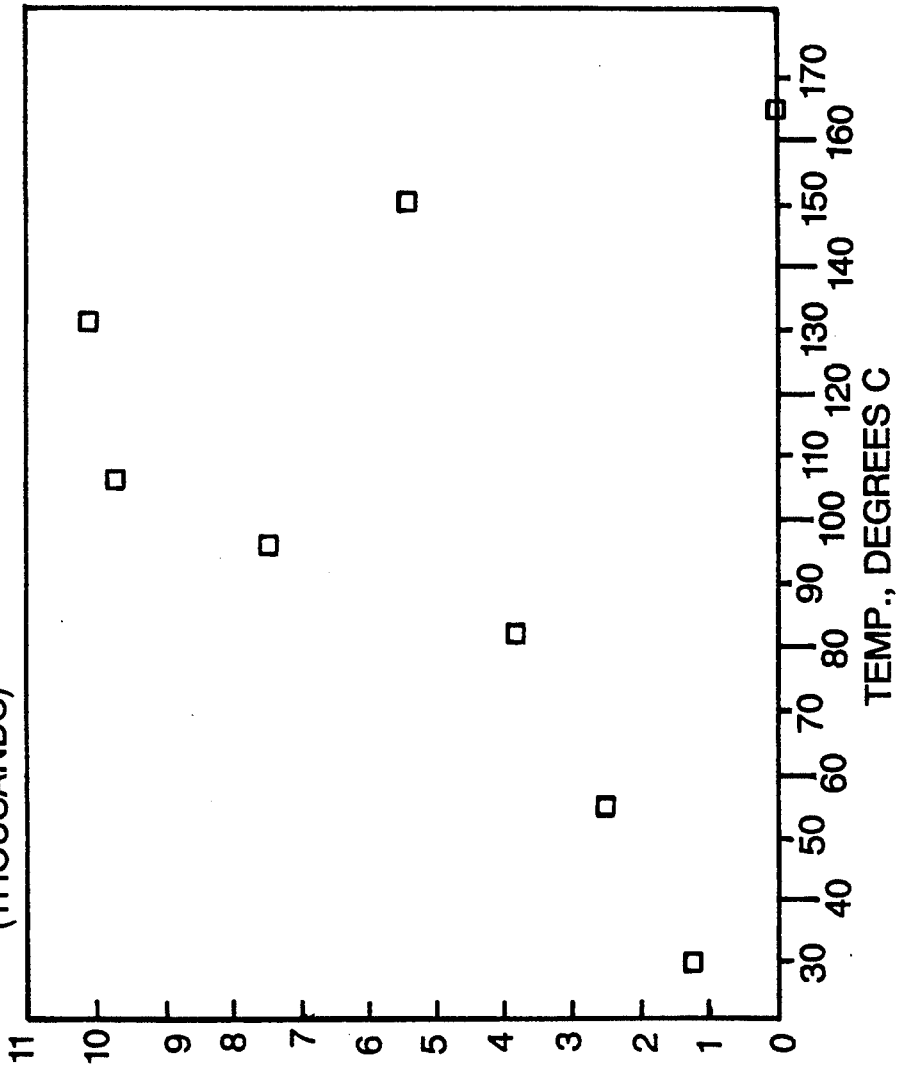
FIG. 18 is a graph of temperature versus total energy absorbed at peak load measured during heat treatment of an exemplary particle barrier material

Heating significantly decreased peak load while it significantly increased peak elongation (enough to increase toughness or TEA) and neck-down. The increased toughness for the samples at higher temperatures indicates decreased process sensitivity. Only a little amount of excess energy is needed to break the web at room temperature while the web is much more forgiving at elevated temperatures. The effects of heating are evident from FIG. 18 which is a graph of temperature versus total energy absorbed at peak load plotted from data taken from Table 5 for the unbonded nonwoven web of meltblown polypropylene. In FIG. 18, it was assumed that the nonwoven web of meltblown polypropylene heated to the melting point of polypropylene (i.e. 165° C.) would have no measurable value for Peak Total Energy Absorbed.

Generally speaking, this range of temperatures at which the Peak Total Energy Absorbed is increased (i.e., increased toughness) is believed to approximately correspond to temperatures ranging from greater than the polypropylene's α-transition to about 10 percent below polypropylene's onset of melting at a liquid fraction of 5 percent.

EXAMPLE 2

Specific physical properties were measured for a control sample and a heat-treated meltblown particle barrier material. The control particle barrier material was a 51 gsm unbonded nonwoven web of meltblown polypropylene fibers. That material was heated to 230° F. (110° C.) and then necked-down about 30 percent to make the heat-treated particle barrier material.

Cup crush test measurements were made to determine the flexibility of the sample. The cup crush test evaluates fabric stiffness by measuring the peak load required for a 4.5 cm diameter hemispherically shaped foot to crush a 9"×9" piece of fabric shaped into an approximately 6.5 cm diameter by 6.5 cm tall inverted cup while the cup shaped fabric is surrounded by an approximately 6.5 cm diameter cylinder to maintain a uniform deformation of the cup shaped fabric. The foot and the cup are aligned to avoid contact between the cup walls and the foot which might affect the peak load. The peak load is measured while the foot descends at a rate of about 0.25 inches per second (15 inches per minute) utilizing a Model FTD-G-500 load cell (500 gram range) available from the Schaevitz Company, Tennsauken, New Jersey. The basis weight of each material sample was determined essentially in accordance with Method 5041 of Federal Test Method Standard No. 191A.

The porosity was determined utilizing a Frazier Air Permeability Tester available from the Frazier Precision Instrument Company and measured in accordance with Federal Test Method 5450, Standard No. 191A, except that the sample size was 8"×8" instead of 7"×7". Porosity may be expressed in units of volume per unit time per unit area, for example, (cubic feet per minute) per square foot of material (e.g., $(ft^3/minute)/ft^2$ or $(CFM/ft^2)$).

Measurements were made of the effective equivalent diameter of pores in the particle barrier material. Pore sizes were determined by liquid displacement techniques utilizing a Coulter Porometer and Coulter POROFIL TM test liquid available from Coulter Electronics Limited, Luton, England. The mean flow pore size is determined by wetting a test sample with a liquid having a very low surface tension (i.e., Coulter POROFIL TM). Air pressure is applied to one side of the sample. Eventually, as the air pressure is increased, the capillary attraction of the fluid in the largest pores is overcome, forcing the liquid out and allowing air to pass through the sample. With further increases in the air pressure, progressively smaller and smaller holes will clear. A flow versus pressure relationship for the wet sample can be established and compared to the results for the dry sample. The mean flow pore size is measured at the point where the curve representing 50% of the dry sample flow versus pressure intersects the curve representing wet sample flow versus pressure. The diameter of the pore which opens at that particular pressure (i.e., the mean flow pore size) can be determined from the following expression:

Pore Diameter (Microns) = $(40\tau)$/pressure where $\tau$ = surface tension of the fluid expressed in units of mN/M; the pressure is the applied pressure expressed in millibars (mbar); and the very low surface tension of the liquid used to wet the sample allows one to assume that the contact angle of the liquid on the sample is about zero.

The particle hold-out efficiency was determined by InterBasic Resources, Inc. of Grass Lake, Michigan, in accordance with IBR Test Method No. E-217, Revision G (Jan. 15, 1991). The test determined air filter retention of dry particles suspended in pure air via a single pass challenge test. A concentrate suspension of contaminant was injected into a feed air stream directed to a test sample. The particle size distribution was measured both upstream and down stream of the test filter. Dry contaminant was obtained from the A.C Spark Plug Division of General Motors Corporation in a Fine Grade (0.09 to 1.0 microns) and a Coarse Grade (1.5 to >10.0 microns). Particle size distribution for Fine Grade particles was determined utilizing a HIAC/Royco 5109 Particle Counting System available from the HIAC/Royco division of Pacific Scientific Company. Particle size distribution for Coarse Grade particles was determined utilizing a HIAC/Royco LD 400 Sensor, S/N 9002-020, available from the HIAC/Royco division of the Pacific Scientific Company. Tests were conducted at room temperature under an airflow of 4 standard cubic feet per minute through a circular sample having a diameter of about 90 mm (i.e., about 58 CFM/ft$^2$).

General properties of the control particle barrier material and the heat-treated particle barrier material are presented in Table 2. Tables 3 and 4 contain the results of particle barrier testing of the control particle barrier material and the heat treated particle barrier material. Generally speaking, a particle barrier material should have about the same basis weight as the control material and much less particle penetration (i.e., greatly improved particle barrier properties).

TABLE 2

|  | Control Unbonded 51 gsm PP MB | Necked-down 30% at 230° F. Surface Temperature |
|---|---|---|
| Bulk (in) | 0.016 | 0.021 |
| Cup Crush |  |  |
| (g) | 242 | 187 |
| (g/mm) | 5223 | 3664 |
| Basis Weight (gsm) | 53.2 | 58.7 |
| MD Tensile |  |  |
| Peak Load (lbs) | 7.63 | 7.54 |
| Peak Elong (%) | 14.2 | 6.42 |
| Peak TEA (in · lbs$_f$)/in$^2$) | 2.43 | 0.882 |
| CD Tensile |  |  |
| Peak Load (lbs) | 4.76 | 3.07 |
| Peak Elong (%) | 27.8 | 36.1 |
| Peak TEA (in · lbs$_f$)/in$^2$) | 2.93 | 1.68 |
| Frazier Porosity (CFM/ft$^2$) | 31 | 32 |
| Coulter Profiles (microns) Mean Flow Pore Size | 17.5 | 17.0 |
| % of pores: |  |  |
| <5 microns | 3 | 3 |
| 5 to 10 | 17 | 14 |
| 10 to 15 | 28 | 30 |
| 15 to 20 | 39 | 39 |
| 20 to 25 | 10 | 10 |
| 25 to 30 | 2 | 3 |
| >30 | <1 | <1 |

TABLE 3

| Sample ID | Main Flow SCFM | Port | Particles/70 cc at: (in microns) | | | | | |
|---|---|---|---|---|---|---|---|---|
|  |  |  | 1.5–2.0 | 2.0–3.0 | 3.0–5.0 | 5.0–7.0 | 7.0–10.0 | >10.0 |
| Control | 4 | Upstream | 3207 | 4680 | 4575 | 1828 | 1680 | 8485 |
| Particle barrier Material |  | Downstream | 87 | 176 | 196 | 140 | 89 | 679 |
| Particle Penetration (%) |  |  | 2.71 | 3.76 | 4.28 | 7.66 | 5.30 | 8.00 |
| Control | 4 | Upstream | 767 | 1173 | 1148 | 484 | 476 | 697 |
| Particle barrier Material |  | Downstream | 25 | 27 | 28 | 6 | 6 | 4 |
| Particle Penetration (%) |  |  | 3.26 | 2.30 | 2.44 | 1.24 | 1.26 | 0.57 |
| Heat-treated | 4 | Upstream | 4117 | 5284 | 4536 | 1850 | 1674 | 3895 |
| Particle barrier Material |  | Downstream | 19 | 30 | 32 | 12 | 24 | 106 |
| Particle Penetration (%) |  |  | 0.46 | 0.57 | 0.71 | 0.65 | 1.43 | 2.72 |
| Heat-treated | 4 | Upstream | 991 | 1446 | 1502 | 711 | 604 | 2580 |
| Particle barrier Material |  | Downstream | 11 | 17 | 12 | 11 | 15 | 88 |
| Particle Penetration (%) |  |  | 1.11 | 1.18 | 0.80 | 1.55 | 2.48 | 3.41 |

TABLE 4

| Sample ID | Main Flow SCFM | Port | Particles/0.2 ft3 at: (in microns) | | | | |
|---|---|---|---|---|---|---|---|
|  |  |  | 0.09–0.1 | 0.1–0.2 | 0.2–0.3 | 0.3–0.5 | 0.5–1.0 |
| Control | 4 | Upstream | 20510 | 104946 | 210265 | 108400 | 84144 |
| Particle barrier Material |  | Downstream | 16997 | 83461 | 142438 | 50937 | 24183 |
| Particle Penetration (%) |  |  | 82.87 | 79.53 | 67.74 | 46.99 | 28.74 |
| Heat-treated | 4 | Upstream | 7728 | 34796 | 45316 | 11165 | 4241 |
| Particle barrier Material |  | Downstream | 3702 | 15620 | 18459 | 3792 | 2016 |

TABLE 4-continued

| Sample ID | Main Flow SCFM | Port | \multicolumn{5}{c}{Particles/0.2 ft3 at: (in microns)} | | | | |
|---|---|---|---|---|---|---|---|
| | | | 0.09–0.1 | 0.1–0.2 | 0.2–0.3 | 0.3–0.5 | 0.5–1.0 |
| Particle Penetration (%) | | | 47.90 | 44.89 | 40.73 | 33.96 | 23.96 |

The foregoing description relates to preferred embodiments of the present invention, modifications or alterations may be made without departing from the spirit and scope of the invention as defined in the following claims.

What is claimed is:

1. A method of producing a nonwoven material having an improved resistance to particle penetration, the method comprising:
   heating a nonwoven web comprising meltblown thermoplastic polymer fibers to a temperature at which the peak total energy absorbed by the web is at least about 250 percent greater than the amount absorbed by the web at room temperature;
   applying a tensioning force to neck the heated nonwoven web so that at least a portion of individual meltblown fibers have sections where the fiber diameter is substantially less than the diameter of the immediately adjacent sections; and
   cooling the necked nonwoven web.

2. The method of claim 1 wherein the meltblown thermoplastic polymer fibers comprise a polymer selected from the group consisting of polyolefins, polyesters, and polyamides.

3. The method of claim 2 wherein the polyolefin is selected from the group consisting of one or more of polyethylene, polypropylene, polybutene, ethylene copolymers, propylene copolymers, and butene copolymers.

4. The method of claim 3 wherein the meltblown thermoplastic polymer fibers comprise meltblown polyolefin fibers and a nonwoven web of such fibers is heated to a temperature ranging from greater than the polymer's α-transition to about 10 percent below the onset of melting at a liquid fraction of 5 percent.

5. The method of claim 3 wherein the meltblown thermoplastic polymer fibers comprises meltblown polypropylene fibers and a nonwoven web of such fibers is heated to a temperature ranging from about 105 to about 145 degrees Centigrade.

6. The method of claim 5 wherein a nonwoven web of meltblown polypropylene fibers is heated to a temperature ranging from about 110 to about 140 degrees Centigrade.

7. The method of claim 5 wherein a nonwoven web of meltblown polypropylene fibers is heated to a temperature ranging from about 120 to about 125 degrees Centigrade.

8. The method of claim 1 wherein the tensioning force is sufficient to neck the nonwoven web to a necked width that is at least about 10 percent less than the width of the nonwoven web before application of the tensioning force.

9. The method of claim 8 wherein the tensioning force is sufficient to neck the nonwoven web to a necked width that is from about 15 percent to about 50 percent less than the width of the nonwoven web before application of the tensioning force.

10. The method of claim 1 wherein the nonwoven web is heated by infra-red radiation, steam cans, microwaves, ultrasonic energy, flame, hot gases, and hot liquid.

11. A nonwoven material comprising at least one web of non-elastomeric meltblown thermoplastic polymer fibers, the web having been heated and then necked causing at least a portion of individual meltblown fibers have sections where the fiber diameter is substantially less than the diameter of the immediately adjacent sections so that the particle penetration is decreased at least about 10 percent more than an identical untreated nonwoven web of meltblown fibers.

12. The nonwoven material of claim wherein the particle penetration is less than about 50 percent for particles having an average diameter of greater than about 0.1 micron.

13. The nonwoven material of claim 11 wherein the particle penetration is less than about 40 percent for particles having an average diameter of greater than about 0.1 micron.

14. The nonwoven material of claim 11 wherein the particle penetration is less than about 5 percent for particles having an average diameter of greater than about 1.5 microns.

15. The nonwoven material of claim 11 wherein the meltblown fibers include meltblown microfibers.

16. The nonwoven material of claim 15 wherein at least about 50 percent, as determined by analytical image analysis, of the meltblown microfibers have an average diameter of less than 5 microns 17. The nonwoven material of claim 11 wherein the non-elastomeric meltblown thermoplastic polymer fibers comprise a polymer selected from the group consisting of polyolefins, polyesters, and polyamides.

18. The nonwoven material of claim 17 wherein the polyolefin is selected from the group consisting of one or more of polyethylene, polypropylene, polybutene, ethylene copolymers, propylene copolymers, and butene copolymers.

19. The nonwoven material of claim 11 wherein the nonwoven web of non-elastomeric meltblown thermoplastic polymer fibers further includes one or more secondary materials selected from the group consisting of textile fibers, wood pulp fibers, particulates and super-absorbent materials.

20. The nonwoven material of claim wherein the nonwoven web has a basis weight of from about 6 to about 400 grams per square meter.

21. A multilayer material comprising at least one layer of the nonwoven material according to claim 11 and at least one other layer.

22. The multilayer material of claim 21 wherein the other layer is selected from the group consisting of woven fabrics, knit fabrics, bonded carded webs, continuous spunbonded filament webs, meltblown fiber webs, and combinations thereof.

23. The multilayer material of claim 21 containing at least one other layer of a nonwoven material according to claim 11 arranged so that an angle of general orientation of fibers between each of the layers ranges from about 0 to about 90 degrees.

24. A nonwoven material comprising at least one web of non-elastomeric meltblown thermoplastic polymer fibers in which at least a portion of individual meltblown fibers have sections where the fiber diameter is substantially less than the diameter of the immediately adjacent sections so that the particle penetration decreased at least about 10 percent more than an identical nonwoven web in which the meltblown fibers do not exhibit the same change in fiber diameter.

25. The nonwoven material of claim 24 wherein the particle penetration is less than about 50 percent for particles having an average diameter of greater than about 0.1 micron.

26. The nonwoven material of claim 24 wherein the particle penetration is less than about 40 percent for particles having an average diameter of greater than about 0.1 micron.

27. The nonwoven material of claim 24 wherein the particle penetration is less than about 5 percent for particles having an average diameter of greater than about 1.5 microns.

28. The nonwoven material of claim 24 wherein the meltblown fibers include meltblown microfibers.

29. The nonwoven material of claim 28 wherein at least about 50 percent, as determined by analytical image analysis, of the meltblown microfibers have an average diameter of less than 5 microns.

30. The nonwoven material of claim 24 wherein the non-elastomeric meltblown thermoplastic polymer fibers comprise a polymer selected from the group consisting of polyolefins, polyesters, and polyamides.

31. The nonwoven material of claim 30 wherein the polyolefin is selected from the group consisting of one or more of polyethylene, polypropylene, polybutene, ethylene copolymers, propylene copolymers, and butene copolymers.

32. The nonwoven material of claim 24 wherein the nonwoven web of non-elastomeric meltblown thermoplastic polymer fibers further includes one or more secondary materials selected from the group consisting of textile fibers, wood pulp fibers, particulates and super-absorbent materials.

33. The nonwoven material of claim 24 wherein the nonwoven web has a basis weight of from about 6 to about 400 grams per square meter.

* * * * *

UNITED STATES PATENT AND TRADEMARK OFFICE
CERTIFICATE OF CORRECTION

PATENT NO. : 5,320,891

DATED : June 14, 1994

INVENTOR(S) : Ruth L. Levy
Michael T. Morman

It is certified that error appears in the above-identified patent and that said Letters Patent is hereby corrected as shown below:

Column 1, line 41, " droplets" should read -- droplets.--;

Column 2, line 18, "fibers" should read --fibers.--;

Column 2, line 41, "entirety" should read --entirety.--;

Column 5, line 12, " diameter" should read --diameter.--;

Column 10, line 29, "material" should read --material.--;

Column 11, line 41, "rial For example" should read --rial. For example--;

Column 12, line 1, "particle" should read --particle.--;

Column 12, line 34, "seconds" should read --seconds.--;

Column 12, line 63, "material" should read --material.--;

Column 13, line 1, "1000 X 0" should read --1000 X--;

Column 13, line 62, "lest" should read --Test--;

UNITED STATES PATENT AND TRADEMARK OFFICE
CERTIFICATE OF CORRECTION

PATENT NO. : 5,320,891

DATED : June 14, 1994

INVENTOR(S) : Ruth L. Levy
Michael T. Morman

It is certified that error appears in the above-identified patent and that said Letters Patent is hereby corrected as shown below:

Column 14, line 32, "broke" should read --broke.--;

Column 14, line 59, "percent" should read --percent.--;

Column 15, line 21, "variables" should read --variables.--;

Column 15, line 39, "temperature" should read --temperature.--;

Column 17, line 10, "pressure" should read --pressure;--;

Column 20, line 20, "claim" should read --claim 11--;

Column 20, line 53, "claim" should read --claim 11--.

Signed and Sealed this

Seventeenth Day of October, 1995

Attest:

BRUCE LEHMAN

Attesting Officer

Commissioner of Patents and Trademarks